US005691736A

United States Patent [19]

Hunn et al.

[11] Patent Number: 5,691,736

[45] Date of Patent: Nov. 25, 1997

[54] RADOME WITH SECONDARY HEAT SHIELD

[75] Inventors: David Lynn Hunn, Kennedale, Tex.; Douglas Ward Freitag, Brookville, Md.; James Richard Wood, Irving; Shawn M. Keough, Arlington, both of Tex.

[73] Assignee: Loral Vought Systems Corporation, Grand Prairie, Tex.

[21] Appl. No.: 412,193

[22] Filed: Mar. 28, 1995

[51] Int. Cl.$^6$ .................. H01Q 1/42; B64D 7/00

[52] U.S. Cl. .................. 343/872; 244/121

[58] Field of Search .................. 244/121, 158 A; 343/872, 873, 708, 705, 841

[56] References Cited

U.S. PATENT DOCUMENTS

| | | | |
|---|---|---|---|
| 3,128,466 | 4/1964 | Brown et al. | 343/705 |
| 3,634,863 | 1/1972 | Dow | 343/873 |
| 3,680,130 | 7/1972 | Jones, Jr. et al. | 343/708 |
| 3,925,783 | 12/1975 | Bleday et al. | 343/705 |
| 3,952,083 | 4/1976 | Goldstein et al. | 264/63 |
| 3,999,376 | 12/1976 | Jeryan et al. | 60/39.32 |
| 4,148,962 | 4/1979 | Leiser et al. | 428/366 |
| 4,173,187 | 11/1979 | Steverding | 102/105 |
| 4,179,699 | 12/1979 | Lunden | 343/872 |
| 4,323,012 | 4/1982 | Driver, Jr. | 102/489 |
| 4,666,873 | 5/1987 | Morris, Jr. et al. | 501/96 |
| 4,677,443 | 6/1987 | Koetje et al. | 343/872 |
| 4,702,439 | 10/1987 | Kelley et al. | 244/158 A |
| 4,797,683 | 1/1989 | Kosowsky et al. | 343/872 |
| 4,847,506 | 7/1989 | Archer | 250/515.1 |
| 4,872,019 | 10/1989 | Chow et al. | 343/753 |
| 4,892,783 | 1/1990 | Brazel | 428/282 |
| 5,358,912 | 10/1994 | Freitag et al. | 501/97 |
| 5,408,244 | 4/1995 | Mackenzie | 343/872 |
| 5,457,471 | 10/1995 | Epperson, Jr. | 343/872 |

FOREIGN PATENT DOCUMENTS

| | | |
|---|---|---|
| 239263 | 9/1987 | European Pat. Off. . |
| 1030010 | 5/1966 | United Kingdom . |
| 2075269 | 11/1981 | United Kingdom . |

*Primary Examiner*—Michael J. Carone
*Assistant Examiner*—Theresa M. Wesson
*Attorney, Agent, or Firm*—Sidley & Austin

[57] ABSTRACT

A secondary heat shield is positioned within a heat shielding radome and spaced from the nose of the radome in order to protect an antenna against thermal radiation from the inner surface of the radome. The secondary heat shield can be a single unitary component integrally formed of a lightweight ceramic which can be easily fabricated in the desired shape and which maintains its shape. The secondary heat shield can be formed of a lightweight ceramic material having a dielectric constant at 17 GHz and 21° C. in the range of about 1 to about 3.5, a thermal conductivity of less than 0.7 W/M-K, and a density at 21° C. of less than 3.2 g/cc. The most preferred ceramic material has a dielectric constant at 17 GHz and 21° C. in the range of about 1.01 to about 2.0, a thermal conductivity in the range of about 0.04 to about 0.08 W/M-K, and a density at 21° C. of less than about 1.0 g/cc. The secondary heat shield comprises a forward dome portion, which can be shaped to act as a lens for radiation emitted from or received by the antenna, and a rearwardly extending skirt portion which laterally encompasses the antenna and other temperature sensitive components.

19 Claims, 1 Drawing Sheet

RADOME WITH SECONDARY HEAT SHIELD

FIELD OF THE INVENTION

This invention relates to a heat shielding radome having an improved lightweight, secondary heat shield positioned within the radome and spaced from the nose of the radome in order to protect a thermally sensitive element, e.g., an antenna, against thermal radiation from the inner surface of the radome. The secondary heat shield can also be shaped to act as a lens for radiation emitted from or received by the antenna.

BACKGROUND OF THE INVENTION

As a radome on a very high speed flight vehicle is subjected to very high temperatures due to aerothermal heating of surfaces, it has become common to form the radome from a ceramic or ceramic-glass dielectric material which has sufficient structural strength to withstand the aerodynamic forces encountered during flight and which provides an electromagnetic window which is transparent to the radiation emitted from or received by an antenna positioned in the interior of the radome. A primary function of the radome is to protect the antenna (or other device such as a radiation reflector) and the associated electronics from the aerothermal environment. However, many of the ceramic materials which have the desired high strength and high hardness also have undesirably high dielectric constant and high thermal conductivity. Also, the ceramic or ceramic-glass materials which have the necessary structural strength are generally relatively heavy. Thus, in order to minimize aberration of the electromagnetic signal, maximize transmission efficiency, minimize thermal gradients in the radome wall, and minimize the total weight of the vehicle, it is desirable that the wall of the radome be as thin as possible. However, the thinner the radome wall, the quicker the temperature of the inside surface of the radome wall rises to a point where thermal radiation and convection from the inside surface of the radome wall becomes detrimental to temperature sensitive components contained within the radome or located at the back end of the radome. Temperature sensitive components used in electromagnetic radiation sensors will suffer performance degradation and, eventually, failure as they are heated above the desired operating temperature range.

As a solution to that problem, Bleday, et al, U.S. Pat. No. 3,925,783, discloses the use of a secondary heat shield positioned between the temperature sensitive components and the inside surface of the nose portion of a ceramic radome. The secondary heat shield is formed of several thin layers of lightweight, non-metallic, heat reflective material which also provides an electromagnetic window for RF transmission, e.g. layers of titanium dioxide epoxy filled paper spaced apart by spacers.

While the Bleday secondary heat shield offers some protection against thermal radiation from the nose portion of the radome, it does not provide adequate protection against thermal radiation from laterally adjacent portions of the radome. Moreover, the construction of the Bleday secondary heat shield in the form of multiple layers of impregnated paper separated by spacers is complicated. While Bleday indicates that the thickness of each layer and the spacing between layers can be varied, achieving and maintaining the desired thicknesses and spacings is difficult.

SUMMARY OF THE INVENTION

Accordingly, it is an object of the invention to provide improved thermal protection of antenna and electrical components from heated radome surfaces by employing a secondary heat shield of a ceramic material having a low thermal conductivity, a low dielectric constant, and a low density. Another object of the invention is to provide a secondary heat shield which can be shaped as a lens to improve the electromagnetic characteristics of the antenna system. A further object of the invention is to provide a secondary heat shield for protecting components within the airframe from heating while allowing high dielectric constant, high thermal conductivity material to be used to form the thin wall radome.

The present invention provides a secondary heat shield for protecting temperature sensitive components, such as an antenna, positioned within a radome, wherein the secondary heat shield is a single, unitary component formed of a lightweight ceramic which can be easily fabricated in the desired shape and which maintains its shape. The secondary heat shield can have a forward dome portion, which can be shaped to act as a lens for radiation emitted from or received by the antenna, and a rearwardly extending skirt portion which laterally encompasses the antenna and other temperature sensitive components.

In accordance with the invention, the secondary heat shield is formed of a ceramic material having a dielectric constant at 17 GHz and 21° C. in the range of about 1 to about 3.5, a thermal conductivity of less than 0.7 W/M-K, and a density at 21° C. of less than 3.2 g/cc. The preferred ceramic material has a dielectric constant at 17 GHz and 21° C. in the range of about 1.01 to about 2.5, a thermal conductivity of less than about 0.2 W/M-K, and a density at 21° C. of less than 2.0 g/cc. The most preferred ceramic material has a dielectric constant at 17 GHz and 21° C. in the range of about 1.01 to about 2.0, a thermal conductivity in the range of about 0.04 to about 0.08 W/M-K, and a density at 21° C. of less than about 1.0 g/cc.

DETAILED DESCRIPTION

Figure 1:
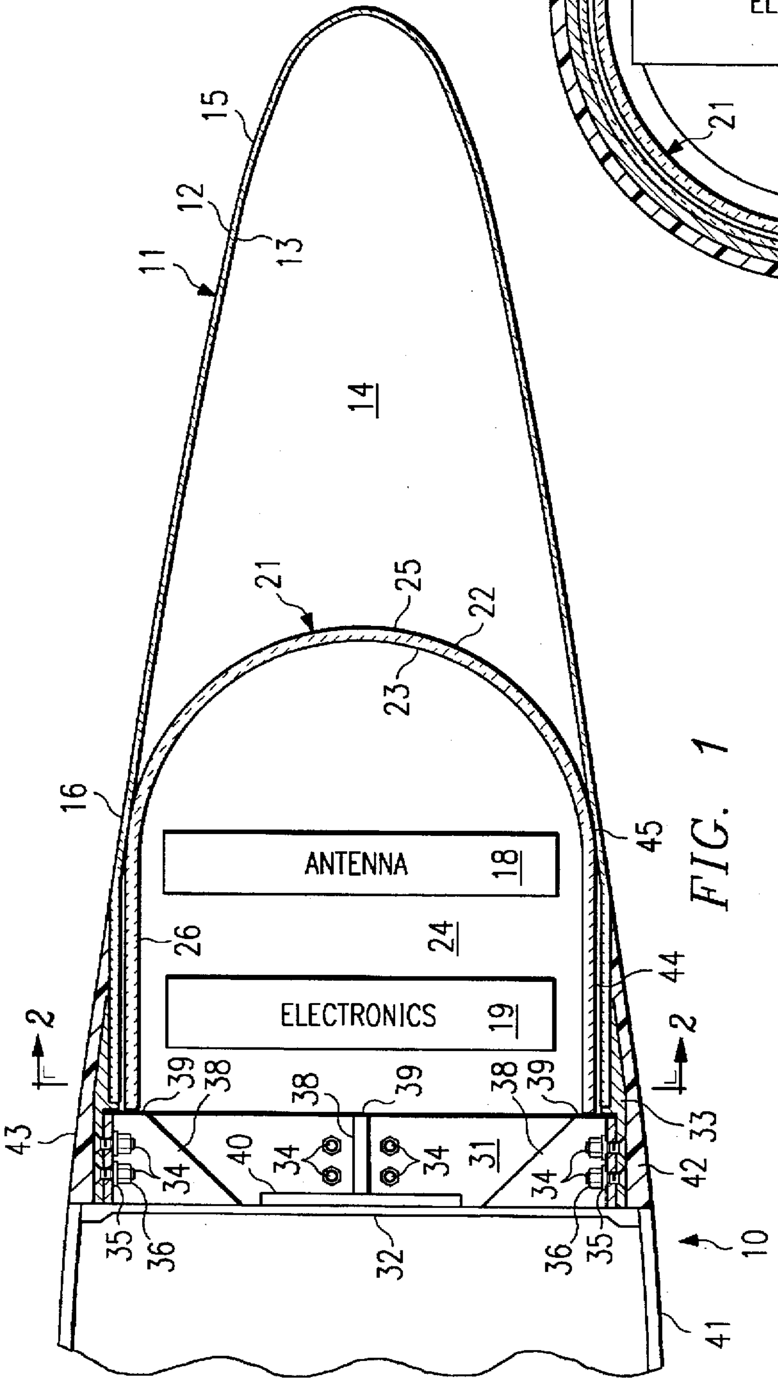
FIG. 1 is a simplified longitudinal sectional view of a radome containing a secondary heat shield in accordance with the present invention.

Referring now to the drawings, the flight vehicle 10 can be any type of vehicle having a radome 11, e.g. an aircraft, spacecraft, missile, etc. The hollow radome 11 has an outer surface 12 and an inner surface 13, the latter forming an interior hollow space 14. The nose portion 15 of the radome 11 has a generally conical configuration, while the rear portion 16 of the radome 11 has a generally frustoconical front section extending from the rear of the nose portion 15 to the front of a generally cylindrical rear section. Temperature sensitive components, e.g. an antenna 18 and electronics 19, are positioned within the interior hollow space 14 so as to be encompassed laterally by the rear portion 16 of the radome 11. The antenna 18 can radiate or receive electromagnetic energy in the desired frequency range, e.g. from DC to 1000 GHz, preferably in the range of about 5 to about 100 GHz. The radome 11 is designed to preserve the radiation or receiving functions or both with minimum aberrations and maximum efficiency.

The radome 11 can be formed of any ceramic or ceramic-glass structure having the attributes of transparency to the radiation emitted from or received by the antenna 18, suitable dielectric properties, high thermal shock resistance, high mechanical strength and toughness, high spall resistance, high refractoriness, and a suitable erosion and ablation rate. While different ceramic or glass-ceramic materials can be employed to form the radome 11, a presently preferred material is the high strength in-situ reinforced ceramic composite disclosed by Douglas Freitag and Kerry Richardson in U.S. Pat. No. 5,358,912, the entire disclosure of which is incorporated herein by reference. This material comprises between about 50 and about 90 volume percent of $Si_3N_4$, of which 30 to 100 volume percent is $\beta$-$Si_3N_4$ elongated fiber-like grains and the remainder is $\alpha$-$Si_3N_4$, and about 10–50 volume percent of barium aluminosilicate. This material can be manufactured by a pressureless sintering process in which silicon nitride and barium aluminosilicate are blended together, isostatically pressed into a desired shape and thereafter sintered to form an in-situ reinforced ceramic composite. In general, the material has a density greater than 3 g/cc at 21° C., and a dielectric constant which varies linearly between about 7.3 at 35 GHz and 21° C. and about 8.6 at 35 GHz and 1400° C.

A secondary heat shield 21 is positioned within the interior hollow space 14 between the nose portion 15 and the temperature sensitive components 18 and 19. The secondary head shield 21 has an exterior surface 22 and an internal surface 23, the latter forming an interior hollow space 24. The secondary heat shield 21 has a forward portion 25 and a tubular portion 26 extending rearwardly from the forward portion 25, such that the temperature sensitive components 18 and 19 are positioned within the interior hollow space 24 of the secondary heat shield 21 and are encompassed laterally by the tubular portion 26 of the secondary heat shield 21. In the illustrated embodiment, the secondary heat shield 21 is interposed between the radome 11 and the temperature sensitive components 18 and 19 so that no portion of the temperature sensitive components 18 and 19 is directly exposed to thermal radiation from any portion of the radome 11.

The forward portion 25 of the secondary heat shield 21 can be in any desired shape, e.g. planar, hemispherical, conical, hyperbolic, or any combination thereof. However, it is presently preferred that the forward portion 25 of the secondary heat shield 21 be in the shape of a lens for the radiation emitted from or received by the antenna 18. In the illustrated embodiment, the forward portion 25 has a generally hemispherical configuration having a convex exterior and a concave interior. The thickness of the wall of the forward portion 25 can be varied in any desired prescription pattern so as to provide the desired lens effect. In the illustrated embodiment, the rearwardly extending tubular portion 26 has an at least substantially cylindrical exterior surface and an at least substantially cylindrical interior surface. However, the rearwardly extending tubular portion 26 can be in any suitable configuration, e.g. a frustoconical configuration, or a stepped configuration comprising a plurality of annular cylindrical segments and/or annular frustoconical segments.

The secondary heat shield 21 can be a single, unitary component of fibrous silica refractory material. The secondary heat shield 21 can be fabricated as a single layer by pressure forming ceramic precursor material between two mold halves and then heating the molded part to convert the precursor material to a ceramic material having the desired shape. On the other hand, the secondary heat shield 21 can be formed as a single block of ceramic material which is then machined to provide the desired interior and exterior surfaces of a single, unitary component. The use of a single layer, integrally formed secondary heat shield 21 is particularly advantageous in the formation and maintenance of the desired lens configuration of the forward portion 25.

The secondary heat shield 21 can be formed of any suitable ceramic material which provides the desired characteristics of transparency to the radiation emitted from or received by the antenna 18, a low dielectric constant, and a low density. The density of the secondary heat shield 21 should be as low as possible in order to minimize the weight added to the vehicle 10 by the presence of the secondary heat shield 21. In order to achieve the desired low density, the ceramic material should be a rigid, highly porous structure. The ceramic material can have a porosity of at least about 40 volume percent, preferably at least about 50 volume percent, and more preferably at least about 75 volume percent. In particular, it is desirable that the secondary heat shield 21 be formed of a lightweight ceramic material having a dielectric constant at 17 GHz and 21° C. in the range of about 1 to about 3.5, a thermal conductivity of less than 0.7 W/M-K, and a density at 21° C. of less than 3.2 g/cc. While ceramic materials having characteristics within the foregoing ranges are considered suitable for fabrication of the secondary heat shield 21, particularly where the density of the ceramic material of the secondary heat shield 21 is substantially less than the density of the material of which the radome 11 is fabricated, it is presently preferred that the secondary heat shield 21 be formed of a fibrous ceramic material having a dielectric constant at 17 GHz and 21° C. in the range of about 1.01 to about 2.5, a thermal conductivity of less than about 0.2 W/M-K, and a density at 21° C. of less than 2.0 g/cc. An even more preferred ceramic material for the fabrication of the secondary heat shield 21 has a dielectric constant at 17 GHz and 21° C. in the range of about 1.01 to about 2.0, a thermal conductivity in the range of about 0.04 to about 0.08 W/M-K, and a density at 21° C. of less than about 1.0 g/cc.

A ceramic material having the preferred characteristics can be formed of a refractory composite insulating material prepared from silica fibers and aluminosilicate fibers in a weight ratio ranging from 1:19 to 19:1, preferably ranging from about 1:9 to about 2:3, and containing from about 0.5 to about 30 wt % boron oxide, based on the total fiber weight, as described by Leiser et al in U.S. Pat. No. 4,148,962, the entire disclosure of which is incorporated herein by reference. The aluminosilicate fiber and boron oxide requirements can be satisfied by using aluminoborosilicate fibers and, in such instances, additional free boron oxide can be incorporated in the mix up to the 30 wt % limit. Small quantities of refractory opacifiers, such as silicon carbide, can be also added. The composites just described are characterized by the absence of a nonfibrous matrix. A satisfactory balance of properties has been achieved with a dry weight ratio of about 4:1 silica fibers to aluminoborosilicate fibers. In the preparation of this ceramic material, the silica fibers and the aluminoborosilicate fibers can be washed, and then an aqueous slurry of the washed fibrous mixture can be poured into a mold for pressing into the desired shape. The final density can be adjusted by varying the compression applied to the fibrous material during the molding operation. After molding, the material is dried and fired.

An annular web 31 extends at least generally parallel to the longitudinal axis of the radome 11 and is secured to a transverse bulkhead 32, which forms a structural part of the vehicle 10 to which the radome 11 is attached. The rear end of the radome 11 fits within and is secured to an annular forward portion of a non-ceramic attachment ring 33. The rearward portion of the attachment ring 33 mates with the exterior of, and is secured to, the annular web 31 by a plurality of bolts 34 spaced circumferentially about the annular web 31. Each bolt 34 is provided with a washer 35 and a nut 36. A plurality of radially extending flanges 38 can extend between the annular web 31 and the bulkhead 32 at spaced apart positions about the circumference of the annular web 31. Each of the radially extending flanges 38 can have a frontal surface 39 which extends inwardly in a plane perpendicular to the longitudinal axis of the radome 11 such that the radial distance from the longitudinal axis of the radome 11 to the inner edge of each front surface 39 is less than the inner diameter of the rear edge of the secondary heat shield 21, thereby providing a plurality of spaced apart surfaces 39 against which the rear edge of the secondary heat shield 21 abuts. This provides a stable mounting for the secondary heat shield 21 while minimizing the contact of the secondary heat shield 21 with the components to its rear and thus minimizing heat transfer by conduction from the secondary heat shield 21. If desired, each of the mounting surfaces 39 can be provided with a forwardly extending shoulder therein at a specified radial distance against which the external surface of the secondary heat shield 21 abuts, thereby maintaining the rear end portion of the secondary heat shield 21 concentric with and spaced from the rear end portion of the radome 11. A mounting plate 40 can be secured to the front of the bulkhead 32 to serve as a base for a gimbal structure (not shown) to permit rotation of the antenna 18 about one or more axes perpendicular to the longitudinal axis of the radome 11.

An outer tubular member 41 can be secured to the periphery of the transverse bulkhead 32 to form the next section of the vehicle 10. Where, as in the illustration, the diameter of the front edge of the member 41 is greater than the outer diameter of the mounting ring 33, an insulating material 42 can be applied to the exterior surface of ring 33 and the rearmost exposed portion of the radome 11 to provide an aerodynamic transition surface 43 extending from the radome 11 to the member 41.

Figure 2:
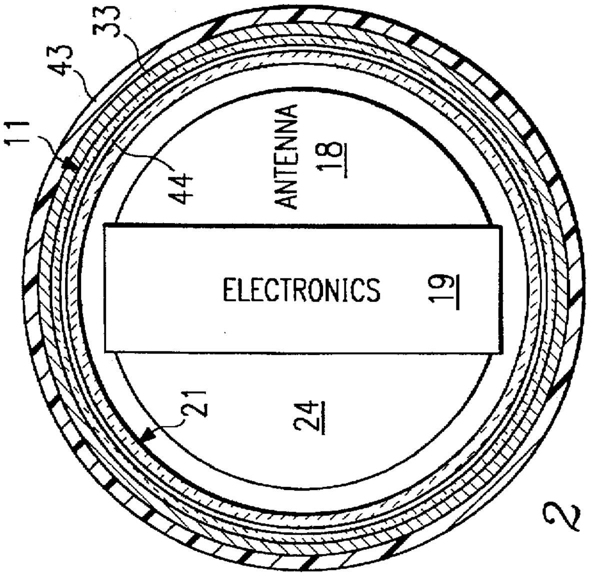
FIG. 2 is a cross-sectional view taken along line 2—2 in FIG. 1.

As shown in FIGS. 1 and 2, there is an annular air gap 44 between the exterior surface of the secondary heat shield 21 and the internal surface 13 of the radome 11 except for a narrow annular line of contact 45 where the internal surface 13 of the radome 11 is generally tangential to the curvature of the external surface 22 of the secondary heat shield 21. This annular line of contact 45 between the secondary heat shield 21 and the radome 11 provides for a stabilization of the position of the secondary heat shield 21 within the inner hollow space 14 of the radome 11, but the width of this annular line of contact 45, in a direction parallel to the longitudinal axis of the radome 11, is selected to be as short as possible to minimize any heat transfer by conduction from the inner surface 13 of the radome 11 to the external surface 22 of the secondary heat shield 21 while still providing the desired stabilization. If desired, the annular line of contact 45 can be omitted so that the external surface 22 of the secondary heat shield 21 is spaced from the internal surface 13 of the radome 11 throughout the extent of the secondary heat shield 21.

Reasonable variations and modifications are possible within the scope of the foregoing description, the drawings and the appended claims to the invention.

What is claimed is:

1. In an apparatus comprising:

a hollow radome having an inner surface forming an interior hollow space, said radome having a nose portion and a rear portion;

at least one temperature sensitive component positioned within said interior hollow space and encompassed laterally by said rear portion of said radome; and a heat shield positioned within said interior hollow space between said at least one temperature sensitive component and said nose portion of said radome, said heat shield being spaced apart from said nose portion of said radome;

the improvement which comprises:

said heat shield being formed of a ceramic material having a dielectric constant at 17 GHz and 21° C. in the range of about 1 to about 3.5, a thermal conductivity of less than 0.7 W/M-K, and a density at 21° C. of less than 3.2 g/cc.

2. Apparatus in accordance with claim 1, wherein said at least one temperature sensitive component comprises an antenna, and wherein said improvement further comprises said heat shield being a single layer shaped to act as a lens for radiation emitted from or received by said antenna.

3. Apparatus in accordance with claim 1, wherein said improvement comprises said heat shield being formed of a ceramic material having a dielectric constant at 17 GHz and 21° C. in the range of about 1.01 to about 2.5, a thermal conductivity of less than about 0.2 W/M-K, and a density at 21° C. of less than 2.0 g/cc.

4. Apparatus in accordance with claim 1, wherein said improvement comprises said heat shield being formed of a ceramic material having a dielectric constant at 17 GHz and 21° C. in the range of about 1.01 to about 2.0, a thermal conductivity in the range of about 0.04 to about 0.08 W/M-K, and a density at 21° C. of less than about 1.0 g/cc.

5. Apparatus in accordance with claim 4, wherein said improvement further comprises said heat shield being a single, unitary, integrally formed component.

6. Apparatus in accordance with claim 1, wherein said heat shield has an inner surface forming an interior hollow space, and wherein said improvement further comprises said heat shield having a forward portion and a tubular portion, with said forward portion being in the shape of a lens and said tubular portion extending rearwardly from said forward portion, with said at least one temperature sensitive component being positioned within the interior hollow space of said heat shield and being encompassed laterally by said tubular portion of said heat shield.

7. Apparatus in accordance with claim 6, wherein said at least one temperature sensitive component comprises an antenna and electronics, and wherein said improvement further comprises said heat shield being a single layer with said forward portion of said heat shield being shaped to act as a lens for radiation emitted from or received by said antenna.

8. Apparatus in accordance with claim 7, wherein said forward portion has a generally convex outer surface, and wherein the thickness of said forward portion varies so as to provide said lens.

9. Apparatus in accordance with claim 6, wherein said improvement further comprises said tubular portion having a generally cylindrical configuration.

10. Apparatus in accordance with claim 6, wherein said improvement further comprises said tubular portion having a generally frustoconical configuration.

11. Apparatus in accordance with claim 6, wherein said improvement further comprises said heat shield being a single, unitary, integrally formed component.

12. Apparatus in accordance with claim 11, wherein said improvement further comprises said heat shield being formed of a ceramic material having a dielectric constant at 17 GHz and 21° C. in the range of about 1.01 to about 2.5, a thermal conductivity of less than about 0.2 W/M-K, and a density at 21° C. of less than 2.0 g/cc.

13. Apparatus in accordance with claim 12, wherein said radome is formed of a ceramic material having a density at 21° C. greater than 3 g/cc.

14. Apparatus in accordance with claim 11, wherein said improvement further comprises said heat shield being formed of a ceramic material having a dielectric constant at 17 GHz and 21° C. in the range of about 1.01 to about 2.0, a thermal conductivity in the range of about 0.04 to about 0.08 W/M-K, and a density at 21° C. of less than about 1.0 g/cc.

15. Apparatus in accordance with claim 14, wherein said radome is formed of a ceramic material having a density at 21° C. greater than 3 g/cc.

16. Apparatus in accordance with claim 14, wherein said radome is formed of a ceramic material having a density at 21° C. greater than 3 g/cc and a dielectric constant at 35 GHz and 21° C. greater than 7.

17. Apparatus in accordance with claim 14, wherein said radome is formed of a ceramic material comprising between about 50 and about 90 volume percent of $Si_3N_4$, of which 30 to 100 volume percent is $\beta$-$Si_3N_4$ elongated fiber-like grains and the remainder is $\alpha$-$Si_3N_4$, and about 10–50 volume percent of barium aluminosilicate.

18. Apparatus in accordance with claim 11, wherein said improvement further comprises said heat shield being a ceramic formed of silica fibers and aluminosilicate fibers in a weight ratio in a range of about 1:9 to about 2:3, and being characterized by the absence of a nonfibrous matrix.

19. Apparatus in accordance with claim 1, wherein said improvement further comprises said heat shield being a ceramic formed of silica fibers and aluminoborosilicate fibers, and being characterized by the absence of a nonfibrous matrix.

* * * * *